United States Patent [19]

Shubow et al.

[11] 4,419,133
[45] Dec. 6, 1983

[54] BONDED AGGREGATE STRUCTURES AND PRODUCTION THEREOF

[75] Inventors: Calvin Shubow, Farmington, Mich.; Robert V. Skinner, Glen Ellyn, Ill.

[73] Assignee: Quadco Component Systems, Inc., Livonia, Mich.

[21] Appl. No.: 325,393

[22] Filed: Nov. 27, 1981

[51] Int. Cl.³ .................................................. C04B 9/04
[52] U.S. Cl. ..................................... 106/85; 501/111; 501/118; 501/119
[58] Field of Search .................. 106/85, 121; 501/111, 501/118, 119

[56] References Cited

U.S. PATENT DOCUMENTS 3,202,520  8/1965  Enoch ................................. 106/121
3,923,534  12/1975  Cassidy ................................ 106/85

*Primary Examiner*—James Poer
*Attorney, Agent, or Firm*—Krass, Young & Schivley

[57] ABSTRACT

Bonded aggregate structures, processes for their production, improved wall, floor and ceiling panel structures laminated with bonded aggregate and methods for their production are provided. The structures are made using a workable quick-setting non-toxic non-ammoniacal mixture of magnesium oxide, aluminum oxide, aggregate and mono aluminum phosphate acidic solution. The panel structures, especially for building purposes and the like, can be made in various forms ranging from low density to load-bearing forms which may be refractory, insulative, heat reflective, light weight, labor and energy conserving, etc.

23 Claims, 2 Drawing Figures

U.S. Patent  Dec. 6, 1983  4,419,133
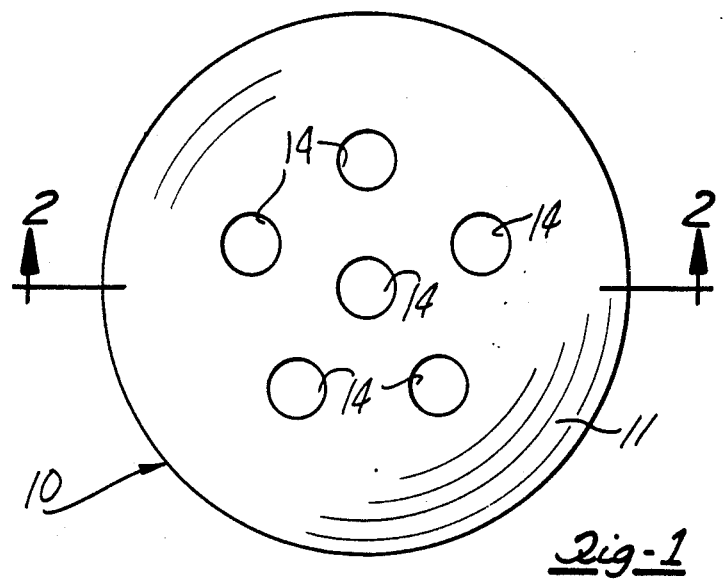
_Fig-1_
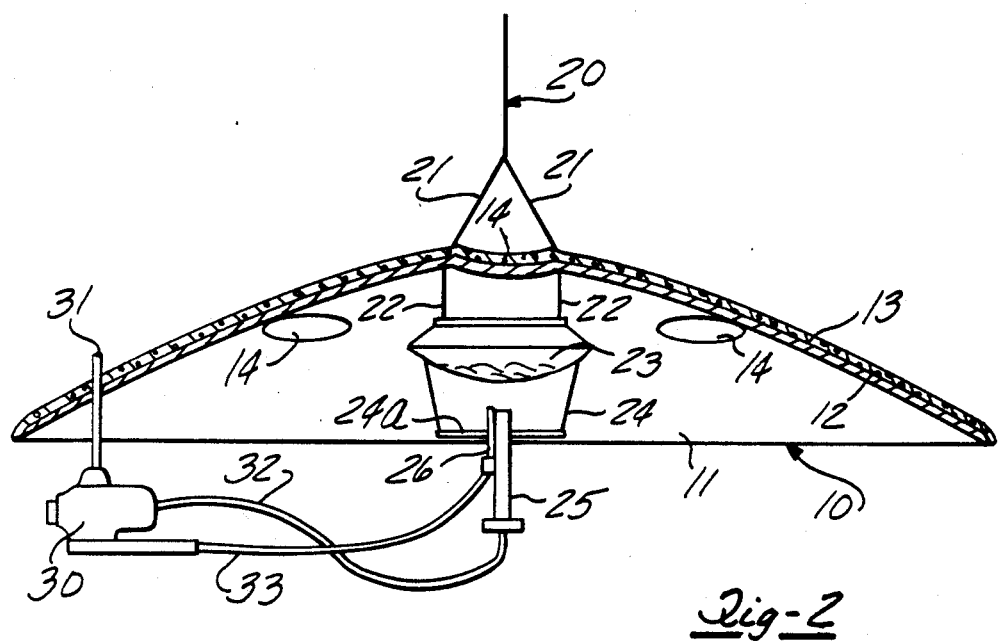
_Fig-2_

BONDED AGGREGATE STRUCTURES AND PRODUCTION THEREOF

TECHNICAL FIELD

This invention relates generally to bonded aggregate structures and their production and to improved building (wall, floor and ceiling) panel structures and the like laminated with bonded aggregate and methods for their production.

BACKGROUND ART

Bonded aggregate structures are well known for refractory purposes (e.g. U.S. Pat. No. 3,285,758) and for outdoor load-bearing and road repair use (e.g., U.S. Pat. No. 4,059,455). The mixtures used for forming the known structures require a high content of ammonium phosphate components. Such use is impractical and even hazardous for many purposes, particularly indoors or at building sites where good ventilation is unavailable to remove the high concentration of gaseous ammonia generated by the bonding reaction.

It is therefore an object of the present invention to provide bonding aggregate structures and means for their production which avoid the disadvantages of the prior art structures and processes.

It is also an object of the invention to provide bonded aggregate structures in any of a variety of densities, compressivities, shapes, reflectivities, insulative and energy transfer qualities, fire resistant properties and the like.

It is another object of the invention to provide economical means for improving the energy efficiency of panel structures and the like as, for example, in furnaces, stoves, heaters, radiant heat panels, wall, floor and ceiling surfaces, building and room dividers, warehouse and storage spaces, heating and processing zones and the like.

It is still another object to provide means for the fast repair, retrofitting and/or construction of insulative or load-bearing surfaces, structures and the like, advantageously at ambient temperature.

These and other objects, features and advantages will be seen from the following detailed description of the invention.

DISCLOSURE OF THE INVENTION

The invention in one aspect is in bonded aggregate structures obtained at ambient temperature by establishing a workable aggregate mixture which undergoes an exothermic reaction, working the mixture into a predetermined form prior to setting, and allowing the worked form to set into a rigid structure. The workable mixtures of the invention are constituted with magnesium oxide, aluminum oxide, aggregate and aqueous mono aluminum phosphate acidic solution; optionally with compatible structural fibers such as glass fibers and filaments. While the quality and proportions of the components are not particularly critical, the weight ratio of aluminum oxide to acidic solution (expressed as 50% solution with a weight ratio $P_2O_5:Al_2O_3$ of about 4) suitably is from about 1:1 to about 1:3, the weight ratio of magnesium oxide to aluminum oxide is from about 1:1 to about 1:6, and the quantity of acidic solution relative to the total mixture is sufficient prior to setting to impart lubricity (that is, smoothness and uniformity) to the mixture. The setting time of the mixture can be varied as desired. By increasing the relative proportion of aluminum oxide, the setting time is increased.

The magnesium oxide used is a dry dead-burned particulate magnesia. A typical chemical analysis and mesh size for magnesia may be the following:

| Oxide | | Standard Mesh Size | |
|---|---|---|---|
| $SiO_2$ | 4.6% | +48 | 0.2% |
| $Fe_2O_3$ | 2.7 | +100 | 6.5 |
| $Al_2O_3$ | 1.2 | +200 | 21.6 |
| CaO | 4.2 | +325 | 17.7 |
| MgO | 87.3 | −325 | 54.0 |
| (Bulk density, g./cc., 3.16) | | | |

The aluminum oxide is a dry alumina powder or calcined alumina for which a typical analysis may be the following:

| Oxide | |
|---|---|
| $SiO_2$ | 0.03% |
| $Fe_2O_3$ | 0.03 |
| $Na_2O$ | 0.13 |
| $Al_2O_3$ | 99.8 |

The aggregate is any suitable siliceous aggregate or mixture of such aggregates having an average density ranging from light to heavy depending on the intended use. The size range of the aggregate is not critical and suitably may be from under 1/16 inch to over ¼ inch. Examples of aggregate materials are cellular and non-cellular materials such as sand, stone, refractory aggregates, silica aggregates and rare earth materials, pea gravel, expanded perlite and vermiculite, volcanic glass, volcanic ash, pumice, glass beads, silica aggregates and the like. In applications where high mass is a problem, the use of cellular, low density aggregate is preferred, the density for strength and low weight advantage preferably being in the range from about 5 to about 15 pounds per cubic foot. Glass beads, perlite and vermiculite are preferred cellular low density aggregates. For high density bonded aggregate structures, an aggregate such as stone, refractory aggregate, sand or gravel is preferred. The aqueous mono aluminum phosphate acidic solution can be varied in concentration and amount used such that it is equivalent for purposes of imparting lubricity and reacting, to an aluminum phosphate, 50% solution, technical grade, having the following typical properties:

| | |
|---|---|
| Formula: | $Al(H_2PO_4)_3 \cdot XH_2O$ (in aqueous solution) |
| Molecular Weight: | 318 for $Al(H_2PO_4)_3$ |
| Description: | A clear, water-white solution |
| Typical Analysis: | |
| $P_2O_5$: | 33.5% |
| $Al_2O_3$: | 8.0% |
| $P_2O_5/Al_2O_3$: | 4.19 |
| $Al_2O_3/P_2O_5$: | 0.24 |
| $AlPO_4$: | 19.0% |
| $H_3PO_4$: | 30.9% |
| Free $H_2O$: | 40% |
| Water of Hydration: | 10% |
| Physical Properties: | |
| pH (1% solution): | 2.5 |
| Specific Gravity: | 1.47 @ 25/15.5° C. |
| Baume: | 46 @ 25° C. |
| Viscosity: | 35–90 centipoise |
| Loss at 110° C. | 48–50% |
| Miscibility w/water | Total |

An advantage of the instant mixtures is that they can be established under cold weather conditions. No external heat is required. The reaction which takes place upon mixing the components is exothermic. The setting time varies depending on the relative quantities of the components. For example, the setting time of the mixture is about 4 to 6 minutes when the weight ratio $MgO:Al_2O_3$ is 1:1 and can be extended correspondingly as this ratio is decreased. Prior to mixing, the dry and wet components are kept separately. For purposes of mixing, the components are then brought together in any suitable way to provide a uniform workable mixture. Conveniently for this purpose, the dry components magnesium oxide, aluminum oxide and aggregate can be formulated in a single package or lot separate from the acidic solution. The latter, contained in an appropriate quantity as a single unit package or lot, can then be combined with the dry components at the site of mixing and forming. The resulting mixture, while still workable is then placed, shaped, compacted, etc., by conventional means, into a suitable form or cast, and allowed to set until rigid, for purposes of repair, retrofitting or construction. The form used can be a cavity or break in a road surface or bridge, a specially made construction form, a building template or modular form, an open space within a wall or floor or ceiling, the wall surfaces of a chimney or furnace, a panel adapted to receive a covering laminate or layer of settable material, or other similar form. An important advantage of the instant bonded aggregate structures is that they are non-ammoniacal so that during mixing, forming and setting no special precautions need be taken to vent the area of ammonia fumes. Other advantages in this regard are that the formulations are temperature insensitive, can be made to have high early strength, and given the benefit of the present teaching, can be adjusted within wide limits to suit the particular requirements of each job. Thus, the formulation can be varied for setting to a fast or slow rock-hard set by varying the ratio of alumina to magnesium oxide; for low density (less than about 15 pounds per cubic foot) or high density (more than about 15 pounds per cubic foot), and for various degrees of wetness, looseness, plasticity, stickiness, adhesion, etc., as desired, without special knowledge, by those skilled in the art. For example, by a procedure described below in greater detail, a good high density, load bearing ceramic material having early high strength can be made with the following components:

|  | Parts By Weight |
| --- | --- |
| Magnesium oxide | 1.5 |
| Aluminum oxide | 1.5 |
| Sand | 3 |
| Mono aluminum phosphate, 50% acidic solution | 3 |

One preferred aspect of the invention is a method of improving the energy efficiency of a room panel or zone-confining panel having a facing surface and an energy-transmissive backing surface. The terms room panel and zone-confining panel as used herein are meant to include wall or floor or ceiling members of buildings; work-station panels, dividers, carrels, stalls, booths, etc.; radiant heat panels, fire walls and false ceilings, panel and wall members of stationary objects such as hoods, stoves, furnaces, vats, boilers, animal shelters, brooders, silos, storage tanks, processing chambers; and the like. The method of improving the energy efficiency of such panels includes the steps of laminating the backing surface, and allowing the thus laminated mixture or cover to set until hard and thereby become rigidly attached to the backing surface. Energy efficiency is realized in that panels laminated according to the invention become heat-insulative, especially panels that are laminated with mixtures containing cellular aggregates such as glass beads, expanded perlite, etc. In the latter case, the K-factor of the resulting bonded aggregate cover is comparable to that of the cellular aggregates per se. When the cover includes a mix of cellular and non-cellular aggregate, certain advantages are seen such as enhanced heat content or capacity whereby the cover has a so-called flywheel effect with respect to retention of heat or energy level over prolonged periods, which serves to avoid precipitous changes in temperature within the confines of the covered panel or panel enclosure. Advantageously, the cover also serves as an acoustical insulator. It will be realized that the cover for the panel can be varied in its coverage of the panel and its thickness. Thus, the cover will ordinarily be completely co-extensive with the panel. The cover can be uniform or non-uniform in thickness, as desired. To assist in strengthening the attachment of the laminate to the cover, anchoring means which may be conventional can be used such as lathing strips, fingers, tie rods, perforations, and the like, spaced at intervals on the panel. A preferred panel embodiment of the invention is an overhead or ceiling panel member and preferably a radiant heat panel, laminated according to the method of the invention. A preferred method embodiment comprises the step of anchoring the laminated mixture to the radiant heat panel by pre-formed mold defining relief surface means in the panel, presently to be described.

Referring to the accompanying drawing of a preferred radiant heat panel or space heater panel, according to the invention, FIG. 1 is a view showing the facing surface; and FIG. 2 is a cross-sectional view of a panel taken on line 2—2 of FIG. 1 showing the panel and its cover of laminated bonded aggregate structure.

As seen in FIGS. 1 and 2, the radiant heat panel 10 has an exposed surface 11 and a congruent backing surface 12 to the latter of which a bonded aggregate 13 is attached. The attachment is favored and prevented from lateral dislodgement by mold forming relief means or sunk relief anchor means 14. A support system 20, suspended from overhead as from the ceiling (not shown) of a building or room by a cable or chain 21 attached to the panel is used to maintain the panel 10 steady at a predetermined position above the floor for purposes of heating the space within the room. Further cable segments 22 support a reflector 23 which in turn by attachment to cable segments 24 and mounting base 24a support a gas burner 25 and pilot 26. The latter burner and pilot unit is serviced by a temperature controller 30, gas supply line 31, and burner and pilot lines 32 and 33. In a preferred embodiment, the panel 10 is 24 gauge steel, 4 feet in diameter with one foot center-to-center radial spacing of the circumferential anchor means 14. The bonded aggregate cover 13 is about 1–2 inches thick. The heating unit uses a burner rated at 15,000 BTU. Air temperature control is adjustable from 78° to 110° F.

In a preferred procedure, the backing surface 12 of the panel is laminated to a depth of about 1 to 2 inches using a uniform mixture of the following components:

|  | Percent By Weight |
|---|---|
| Magnesium oxide (BRI® dry burned MAGNESITE BD87, available from Basic Refractories Cleveland, Ohio) | 10 |
| Aluminum oxide, calcined (C-70 to C-75 FG, available from Alcan Aluminum Corporation) | 30 |
| Glass beads, cellular, (size distribution, 1/16" to ¼", available from Norton Chemical Co.) | 30 |
| Mono Aluminum Phosphate, 50% aqueous solution, (available from Stauffer Chemical Co., Westport, Conn.) | 30 |

The dry ingredients are first mixed, and the solution is then added with thorough mixing at ambient temperature to provide a smooth mixture. The resulting mixture is applied in a layer by troweling or other suitable means to the top of the radiant heat panel and allowed to set. The mixture sets to rock-like hardness in about 6 to 8 minutes. The laminated panel can be used immediately for radiating heat. Suprisingly, the savings in energy usage typically is 20 to 50% or more. The increased efficiency is seen by the fact that heat losses are minimized such that to maintain a given temperature, the burner unit is activated substantially less frequently then with prior art uncoated heater panels.

The lamination according to the invention can be advantageously done using a conventional panel 10 which lacks the relief shaped anchor means 14. Optionally, the facing surface 11 of the cover 13 can be coated with a suitable light or heat reflective paint or similar coating. The radiant heat panels of the invention are preferred for animal shelters, especially for brooder radiant heat panels used, for example, in raising chicks.

The embodiments of the invention in which an exclusive property or privilege is claimed are defined as follows:

1. A bonded aggregate structure obtained by establishing a non-ammoniacal workable mixture of magnesium oxide, aluminum oxide, aggregate, and aqueous mono aluminum phosphate acidic solution, the weight ratio of aluminum oxide to acidic solution (expressed as 50% solution with $P_2O_5:Al_2O_3$ of about 4) being from about 1:1 to about 1:3, the weight ratio of magnesium oxide to aluminum oxide being from about 1:1 to about 1:6, and the quantity of acidic solution relative to the total mixture being sufficient prior to setting to impart lubricity to the mixture; working the mixture into a predetermined form, and allowing the thus worked form to set into a rigid structure.

2. A structure according to claim 1 where the aggregate is cellular and has a low density in the range from about 5 to about 15 pounds per cubic foot.

3. A structure according to claim 2 where the aggregate comprises glass beads.

4. A structure according to claim 2 where the aggregate comprises perlite.

5. A structure according to claim 2 where the aggregate comprises vermiculite.

6. A structure according to claim 1 where the aggregate comprises a stone or refractory aggregate.

7. A structure according to claim 2 made from a mixture containing by approximate weight 10% magnesium oxide, 30% aluminum oxide, 30% aggregate and 30% acidic solution.

8. A structure according to claim 7 where the aggregate comprises glass beads.

9. A process for producing a bonded aggregate structure comprising the steps of establishing a workable non-ammoniacal mixture of magnesium oxide, aluminum oxide, aggregate and aqueous mono aluminum phosphate acidic solution, the weight ratio of aluminum oxide to acidic solution (expressed as 50% solution with $P_2O_5:Al_2O_5$ of about 4) being from about 1:1 to about 1:3, the weight ratio of magnesium oxide to aluminum oxide being from about 1:1 to about 1:6, and the quantity of acidic solution relative to the total mixture being sufficient prior to setting to impart lubricity to the mixture; working the mixture into a predetermined form; and allowing the thus worked form to set into a rigid structure.

10. A process according to claim 9 where the aggregate is cellular and has a low density in the range from about 5 to about 15 pounds per cubic foot.

11. A process according to claim 10 where the aggregate comprises glass beads.

12. A process according to claim 10 where the aggregate comprises perlite.

13. A process according to claim 10 where the aggregate comprises vermiculite.

14. A process according to claim 9 where the aggregate comprises a stone or refractory aggregate.

15. A process according to claim 10 made from a mixture containing by approximate weight 10% magnesium oxide, 30% aluminum oxide, 30% aggregate and 30% acidic solution.

16. A process according to claim 15 where the aggregate comprises glass beads.

17. A method of improving the energy efficiency of a room panel or zone-confining panel having a facing surface and an energy-transmissive backing surface, which comprises the steps of establishing a workable mixture of magnesium oxide, aluminum oxide, aggregate and aqueous mono aluminum phosphate acidic solution according to claim 9, laminating the backing surface with the workable mixture to provide a generally co-extensive energy conserving cover for the backing surface, and allowing the thus laminated mixture to set until hard and thereby become rigidly attached to the backing surface.

18. A method according to claim 17 where the panel is a floor or wall member.

19. A method according to claim 17 where the panel is an overhead or ceiling member.

20. A method according to claim 19 where the panel is a radiant heat panel.

21. A method according to claim 20 which comprises the step of anchoring the mixture to the panel by preformed mold defining relief surface means in the panel.

22. A method according to claim 21 which comprises the step of removing the relief surface means subsequent to the setting of the laminated mixture such that portions of the underside of the laminated mixture are exposed.

23. A radiant heat panel produced by the method of claim 20.

* * * * *